US011012722B2

(12) United States Patent
Reynolds

(10) Patent No.: US 11,012,722 B2
(45) Date of Patent: May 18, 2021

(54) SYSTEM AND METHOD FOR SECURELY TRANSFERRING DATA

(71) Applicant: Secure Cloud Systems, Inc., Marco Island, FL (US)

(72) Inventor: Timothy W. Reynolds, Colorado Springs, CO (US)

(73) Assignee: Secure Cloud Systems, Inc., Marco Island, FL (US)

( * ) Notice: Subject to any disclaimer, the term of this patent is extended or adjusted under 35 U.S.C. 154(b) by 360 days.

(21) Appl. No.: 15/902,259

(22) Filed: Feb. 22, 2018

(65) Prior Publication Data

US 2019/0261028 A1   Aug. 22, 2019

(51) Int. Cl.
| | | |
|---|---|---|
| *H04N 21/2347* | (2011.01) | |
| *H04L 9/32* | (2006.01) | |
| *H04L 29/06* | (2006.01) | |
| *H04N 21/266* | (2011.01) | |
| *H04N 21/845* | (2011.01) | |

(52) U.S. Cl.
CPC ....... *H04N 21/2347* (2013.01); *H04L 9/3213* (2013.01); *H04L 63/0435* (2013.01); *H04L 63/06* (2013.01); *H04N 21/26613* (2013.01); *H04N 21/8456* (2013.01)

(58) Field of Classification Search
CPC ......... H04N 21/2347; H04N 21/26613; H04N 21/8456; H04L 9/3213; H04L 63/06; H04L 63/0435; H04L 9/0861; H04L 9/3226; H04L 9/085; H04W 12/001
See application file for complete search history.

(56) References Cited

U.S. PATENT DOCUMENTS

| | | | |
|---|---|---|---|
| 5,748,740 | A | 5/1998 | Curry et al. |
| 5,889,860 | A | 3/1999 | Eller et al. |
| 5,917,913 | A | 6/1999 | Wang |
| 6,105,013 | A | 8/2000 | Curry et al. |
| 6,148,342 | A | 11/2000 | Ho |
| 7,171,693 | B2 | 1/2007 | Tucker et al. |
| 7,568,114 | B1 | 7/2009 | Schlafly |
| 7,720,864 | B1 | 5/2010 | Muth et al. |
| 7,937,579 | B2 | 5/2011 | Peckover |

(Continued)

FOREIGN PATENT DOCUMENTS

| | | |
|---|---|---|
| WO | 2001/080141 A1 | 10/2001 |
| WO | 2006/094316 A2 | 9/2006 |

OTHER PUBLICATIONS http://securecloudsystems.com/our-solutions/your-challenge/.

(Continued)

*Primary Examiner* — Mohammad W Reza
(74) *Attorney, Agent, or Firm* — Akerman LLP

(57) ABSTRACT

According to one example, a system includes a first computing device that includes one or more processors configured to receive a request, from a second computing device, for data; generate a first encryption key; and encrypt the requested data using the first encryption key. The one or more processors are further configured to determine a first set of tokens; determine, from the first set of tokens, a plurality of tokens for the first encryption key; generate a packet comprising the encrypted requested data, and further comprising the plurality of tokens; and transmit the packet for receipt by the second computing device.

17 Claims, 4 Drawing Sheets

(56) References Cited

U.S. PATENT DOCUMENTS

| | | |
|---|---|---|
| 7,941,376 B2 | 5/2011 | Peckover |
| 7,970,669 B1 | 6/2011 | Santos |
| 8,055,913 B2 | 11/2011 | Ginter et al. |
| 8,261,058 B2 | 9/2012 | Peckover |
| 8,359,271 B2 | 1/2013 | Peckover |
| 8,543,806 B2 | 9/2013 | Peckover |
| 8,613,107 B2 | 12/2013 | Peckover |
| 8,639,947 B2 | 1/2014 | Elovici et al. |
| 8,826,448 B2 | 9/2014 | Peckover |
| 8,965,066 B1 | 2/2015 | Derakhshani et al. |
| 9,009,829 B2 | 4/2015 | Stolfo et al. |
| 9,037,858 B1 | 5/2015 | Juels et al. |
| 2002/0026321 A1 | 2/2002 | Faris et al. |
| 2002/0112178 A1 | 8/2002 | Scherr |
| 2002/0178370 A1* | 11/2002 | Gurevich ............... G06F 21/34 713/189 |
| 2003/0202661 A1* | 10/2003 | Rodriguez ....... H04N 21/63345 380/239 |
| 2005/0235163 A1 | 10/2005 | Forlenza |
| 2005/0256822 A1 | 11/2005 | Hollingsworth |
| 2007/0250930 A1 | 10/2007 | Aziz et al. |
| 2008/0065891 A1 | 3/2008 | Karamchedu et al. |
| 2008/0222734 A1 | 9/2008 | Edlich et al. |
| 2008/0244721 A1* | 10/2008 | Barrus ............... G06F 21/6254 726/9 |
| 2009/0106154 A1 | 4/2009 | Reynolds et al. |
| 2009/0254572 A1 | 10/2009 | Redlich et al. |
| 2010/0250497 A1 | 9/2010 | Redlich et al. |
| 2010/0280909 A1 | 11/2010 | Zhang et al. |
| 2010/0306072 A1 | 12/2010 | Ford, Jr. et al. |
| 2011/0047081 A1 | 2/2011 | Kelly et al. |
| 2011/0083020 A1 | 4/2011 | Michiels et al. |
| 2011/0161671 A1 | 6/2011 | Whitehouse |
| 2012/0042162 A1 | 2/2012 | Anglin et al. |
| 2013/0097085 A1 | 4/2013 | Peckover |
| 2013/0117561 A1 | 5/2013 | Chawla et al. |
| 2013/0136258 A1 | 5/2013 | Grube |
| 2013/0159707 A1* | 6/2013 | Jogand-Coulomb ... G06F 21/10 713/164 |
| 2013/0218738 A1 | 8/2013 | Senapati et al. |
| 2014/0023193 A1 | 1/2014 | Landheer |
| 2014/0115724 A1 | 4/2014 | Van Brandenburg |
| 2014/0279553 A1 | 9/2014 | Kassemi et al. |
| 2015/0270955 A1 | 9/2015 | Arnold et al. |
| 2016/0267022 A1 | 9/2016 | Schoenberger et al. |
| 2016/0274912 A1 | 9/2016 | Schoenberger et al. |

OTHER PUBLICATIONS http://social.technet.microsoft.com/wiki/contents/articles/12956.biztalk-server-list-of-third-party-adapters.aspx.
http://docs.oracle.com/cd/E18727_01/doc.121/e13570/T172155T172160.htm.
https://web.archive.org/web/20121204005735/http:/www.transcertain.com/Services.html#CertainStore.
Alexandrov et al., "Superweb: Research Issues in Java-Based Global Computing", Department of Computer Science, University of California, 1996.
Ajmani et al., "A Trusted Third-Party Computation Service", MIT Laboratory for Computer Science, 2001.
International Search Report issued in connection with PCT/US16/22897.
Written Opinion of the International Searching Authority issued in connection with PCT/US16/22897.
U.S. Appl. No. 15/073,114, filed Mar. 17, 2016.
International Search Report and Written Opinion of the International Searching Authority dated Jun. 6, 2019 in connection with PCT/US19/19096.

* cited by examiner

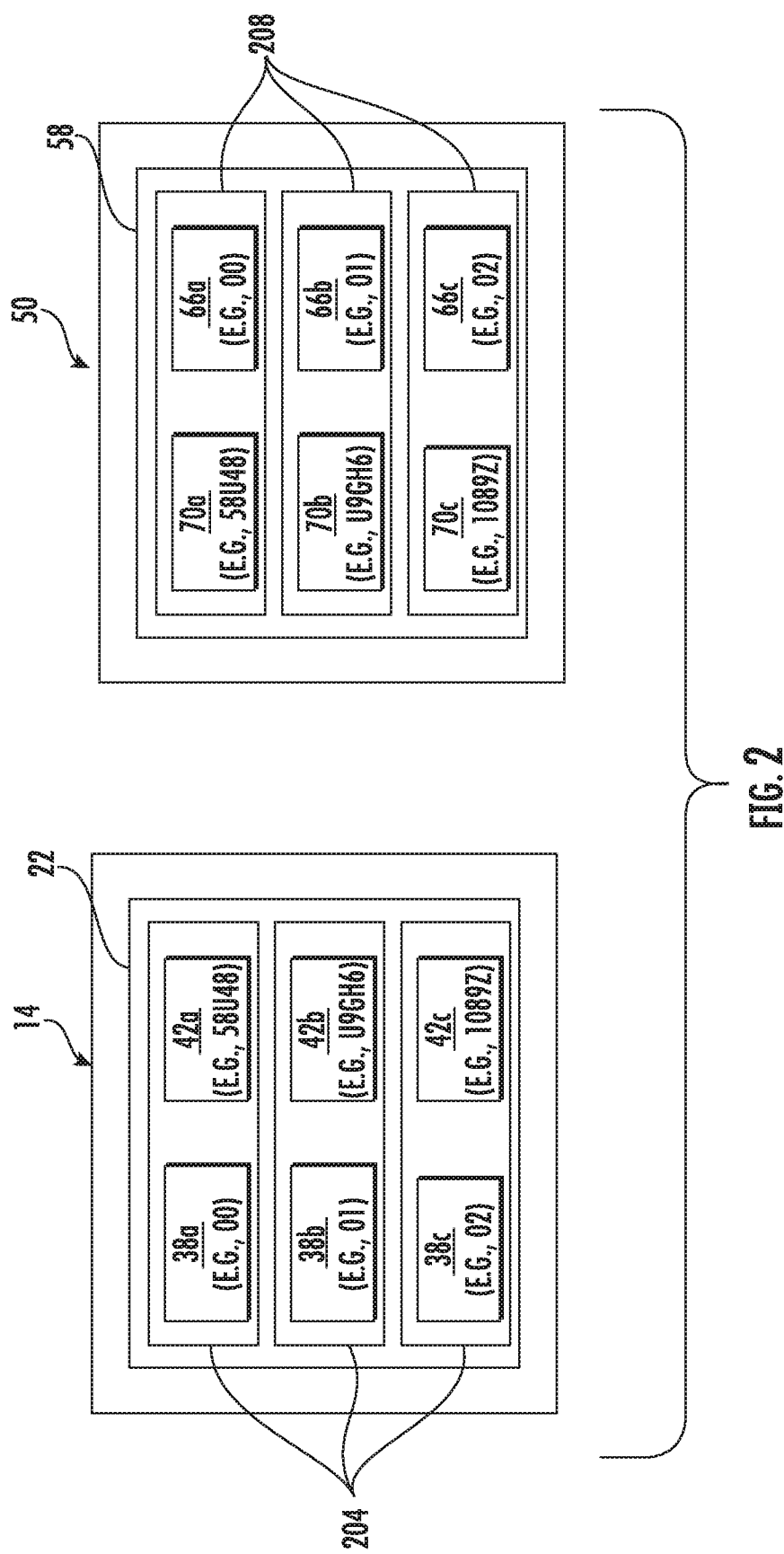

SYSTEM AND METHOD FOR SECURELY TRANSFERRING DATA

TECHNICAL FIELD

This disclosure relates generally to the field of computer-based communication, and more specifically to a system and method for securely transferring data.

BACKGROUND

Typically, when a device requests data from a second device, the second device may send that data in an unsecured manner or using traditional security measures (e.g., Secure Sockets Layer (SSL) protocol). These traditional methods of transferring data, however, may be deficient.

SUMMARY

In a first example, a system includes a first computing device and a second computing device. The first computing device has one or more first memory units that store one or more first instructions; and further has one or more first processors coupled to the first memory units. Upon executing the one or more first instructions, the first processors of the first computing device receive a request for a portion of a streaming file from a second computing device; generate a first encryption key; encrypt the requested portion of the streaming file using the first encryption key; and break the first encryption key into a plurality of key portions. Furthermore, the first processors of the first computing device generate a first set of tokens; determine, from the first set of tokens, a first token for each of the plurality of key portions; generate a packet having the encrypted requested portion of the streaming file, and further having the first tokens; and transmit the packet for receipt by the second computing device. The second computing device has one or more second memory units that store one or more second instructions; and further has one or more second processors coupled to the second memory units. Upon executing the one or more second instructions, the second processors of the second computing device generate a second set of tokens that matches the first set of tokens; receive the packet; match each of the first tokens to a second token in the second set of tokens; determine the plurality of key portions based on the second tokens; re-assemble the plurality of key portions into the first encryption key; de-crypt the encrypted requested portion of the streaming file using the first encryption key; and transmit the requested portion of the streaming file to a user of the second computing device.

In a second example, a system includes a first computing device that has one or more memory units that store one or more instructions, and that further has one or more processors coupled to the memory units. Upon executing the one or more instructions, the processors of the first computing device receive a request for data from a second computing device; generate a first encryption key; and encrypt the requested data using the first encryption key. Furthermore, the processors of the first computing device determine a first set of tokens; determine, from the first set of tokens, a plurality of tokens for the first encryption key; generate a packet having the encrypted requested data, and further having the plurality of tokens; and transmit the packet for receipt by the second computing device.

In such an example, the processors of the first computing device may also receive a request for second data from the second computing device; generate a second encryption key; encrypt the requested second data using the second encryption key; determine a second set of tokens; determine, from the second set of tokens, a plurality of second tokens for the second encryption key; generate a second packet having the encrypted requested second data, and further having the plurality of second tokens; and transmit the second packet for receipt by the second computing device.

In a third example, a system includes a second computing device that has one or more memory units that store one or more instructions; and that further has one or more processors coupled to the memory units. Upon executing the one or more instructions, the processors of the second computing device transmit a request for data from the first computing device; and following transmission of the request, receive a packet from the first computing device, where the packet has the requested data in encrypted form and further has a plurality of tokens for a first encryption key used to encrypt the requested data. Furthermore, the processors of the second computing device generate a second set of tokens; determine the first encryption key using the plurality of tokens and the second set of tokens; de-crypt the requested data using the first encryption key; and transmit the requested data to a user of the second computing device.

BRIEF DESCRIPTION OF THE FIGURES

For a more complete understanding of the present disclosure and its features and advantages, reference is now made to the following description, taken in conjunction with the accompanying drawings, in which:

FIG. 2 illustrates example associations of the system of FIGS. 1A-B; and

DETAILED DESCRIPTION

Figure 3:
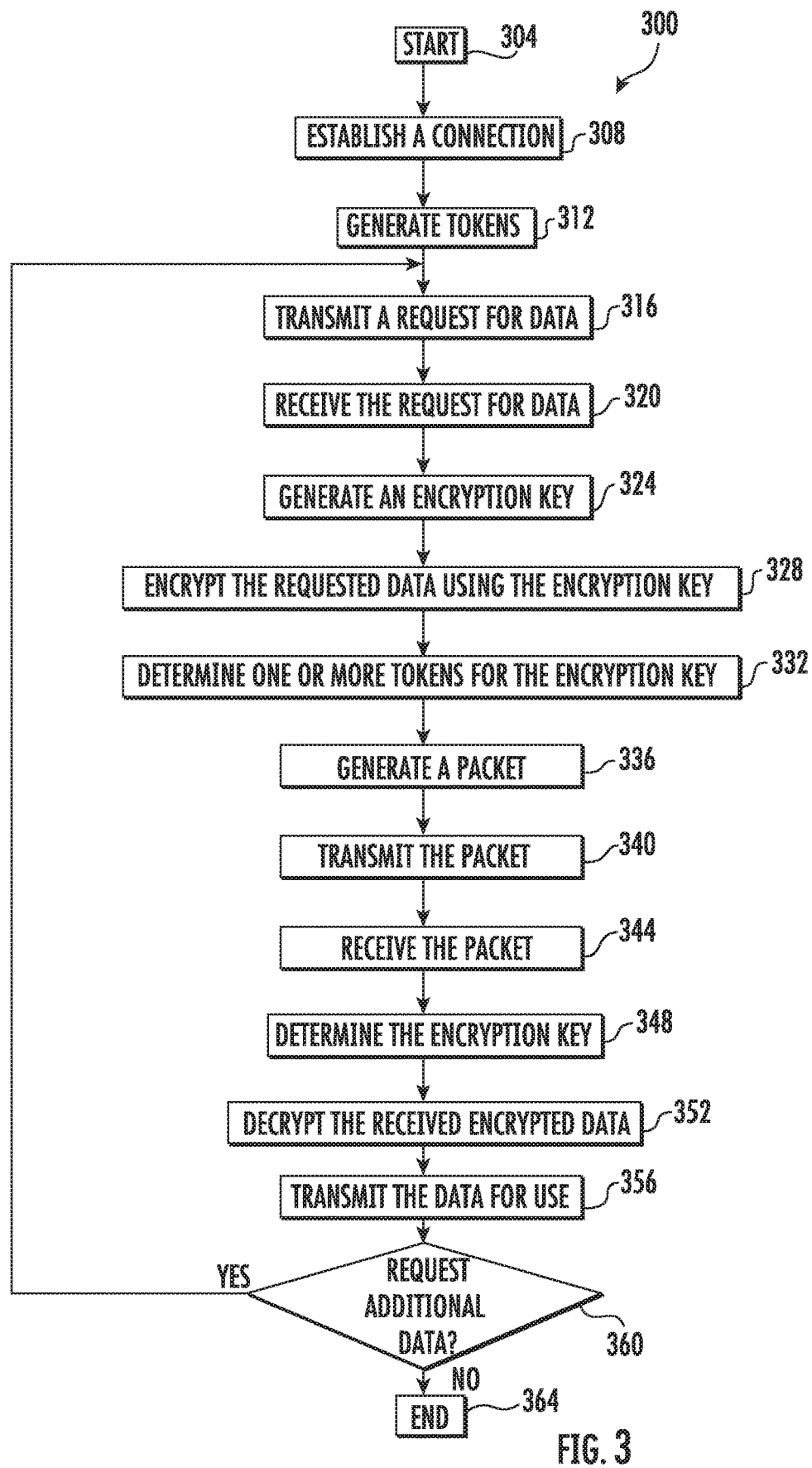
FIG. 3 illustrates an example method for securely transferring data.

Embodiments of the present disclosure are best understood by referring to FIGS. 1-3 of the drawings, like numerals being used for like and corresponding parts of the various drawings.

Typically, when a device requests data from a second device, the second device may send that data in an unsecured manner. This, however, may be problematic, as an unauthorized entity (e.g., a hacker) may be able to listen to, capture, or otherwise access the transmitted data. Furthermore, even when the second device transmits that data using traditional security measures, an unauthorized entity may still be able to access the data. For example, some data may be sent via SSL protocol, which may be susceptible to hacking. As another example, some data may be encrypted using one or more encryption keys prior to the data being sent. These encryption keys, however, are typically stored at the first device (i.e., the device requesting the data) and/or the second device (i.e., the device sending the data). As such, an unauthorized entity may hack one or more of these devices in order to obtain the encryption keys, thereby gaining access to the transmitted data.

Figure 1A:
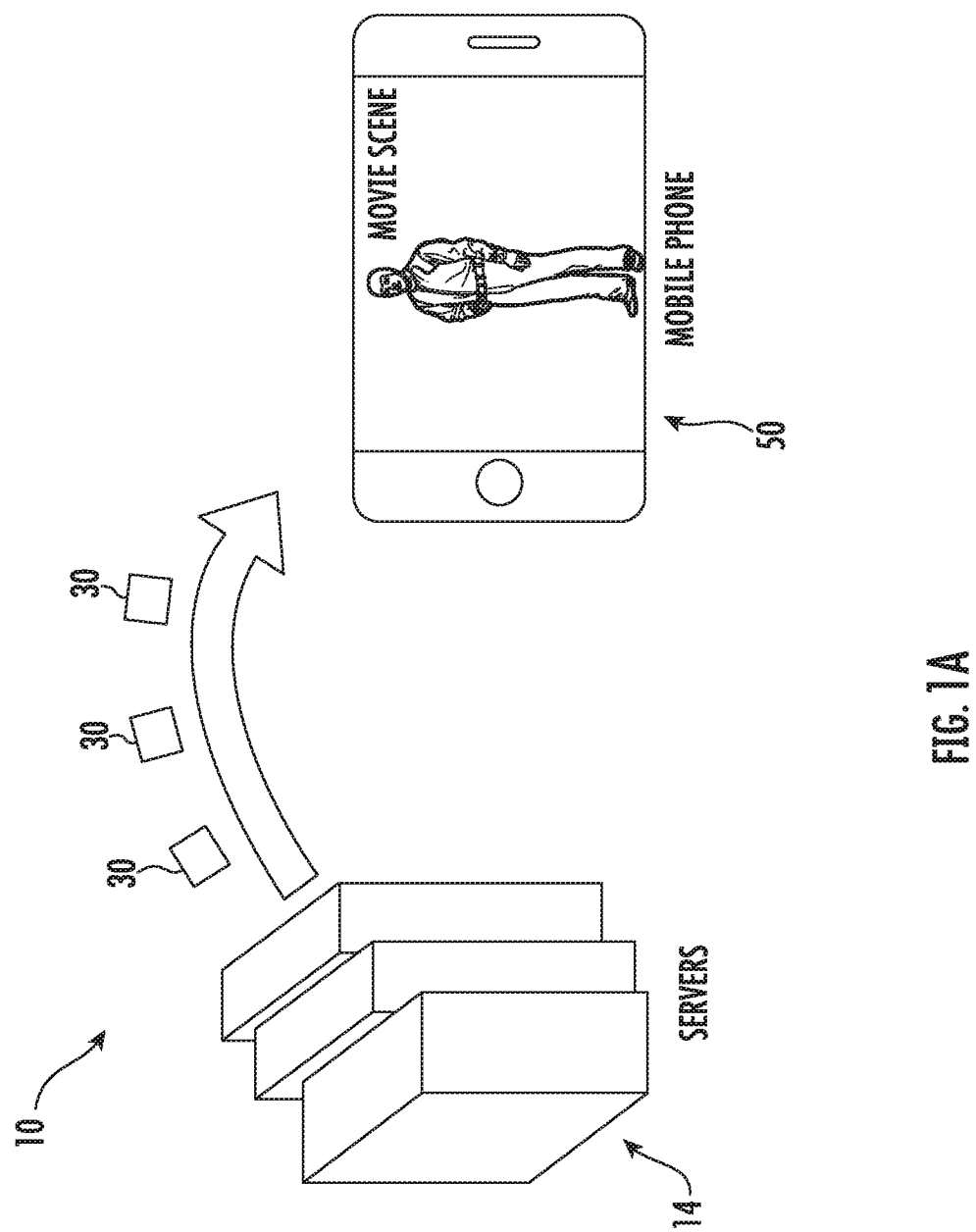
FIGS. 1A-1B illustrate an example system for securely transferring data.
Figure 1B:
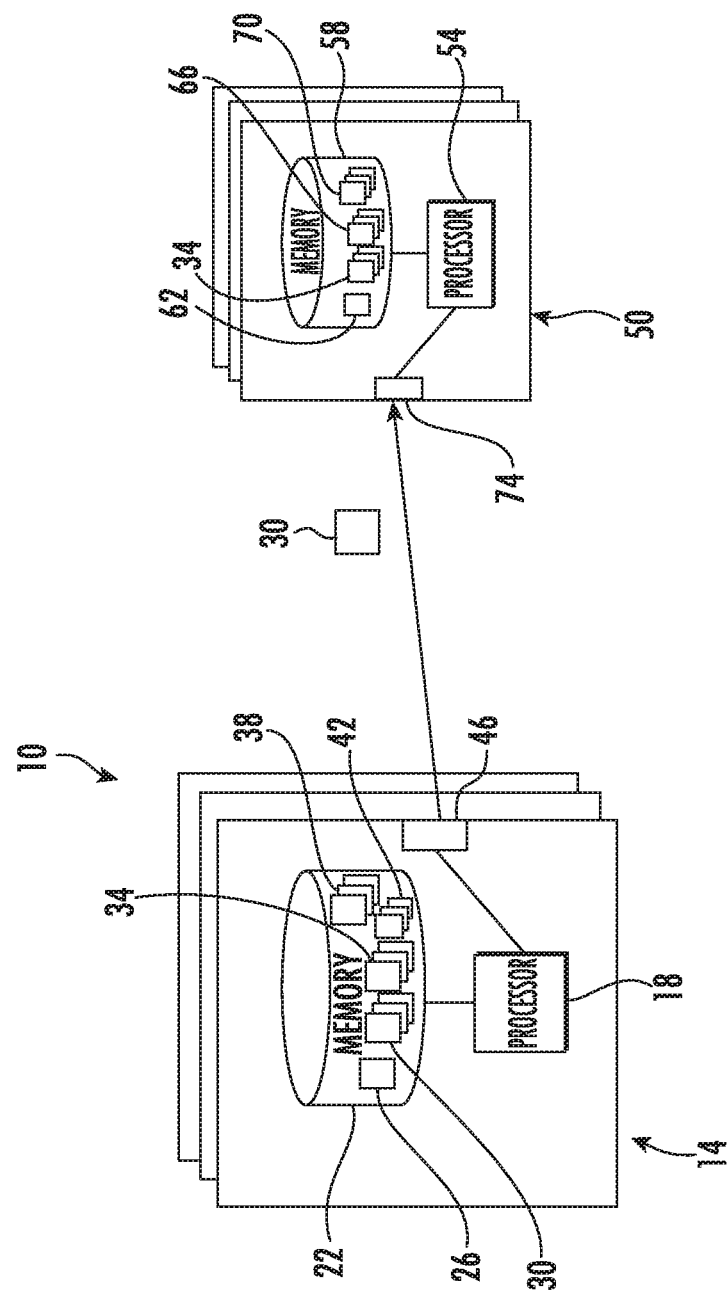

Contrary to this, the system 10 of FIGS. 1A-1B may address one or more of these deficiencies. FIGS. 1A-1B illustrate an example system 10 for securely transferring data 30. As is illustrated, system 10 includes a data device 14 (e.g., a server) that stores data 30 (e.g., a streaming video file). When the data device 14 receives a request for data 30 (e.g., a portion of the streaming video file) from a requesting device 50 (e.g., a mobile phone), the data device 14 may determine an encryption key to be used to encrypt the requested data 30. Following encryption of the data 30, the encrypted data 30 may be transmitted to the requesting device 50. The actual encryption key used to encrypt the data 30, however, may not be sent to the requesting device 50. Instead, the data device 14 may have a set of storage tokens 42 (e.g., a set of characters, such as "58U48"), and may determine one or more of these storage tokens 42 for the encryption key. For example, the data device 14 may break the encryption key into key portions, and then may select a storage token 42 for each key portion. Then, the data device 14 may transmit the determined storage tokens 42 to the requesting device 50 in the same packet with the encrypted requested data 30.

Following reception of the packet, the requesting device 50 may utilize its own receiving tokens 70 to determine the encryption key. For example, the requesting device 50 may have a set of receiving tokens 70 that matches the set of storage tokens 42 stored on the data device 14. In such an example, the requesting device 50 may match the received storage tokens 42 to its receiving tokens 70 so as to determine each key portion of the encryption key. Then, the requesting device 50 may re-assemble the encryption key in order to determine the encryption key. Following determination of the encryption key, the requesting device 50 may decrypt the encrypted requested data 30, and then transmit the requested data 30 to a user of the requesting device 50 (e.g., the mobile phone may display the requested streaming video file to a user).

This example procedure may allow the data device 14 to securely transmit the data 30, in some examples. For example, not only may the data 30 be encrypted (thereby providing a first level of security), but the actual encryption key may not be transmitted to the requesting device 50 (thereby providing a second level of security). Additionally, because the actual encryption key may be determined by the requesting device 50 based on storage tokens 42 and receiving tokens 70, the actual encryption key may not need to be stored on disk in either the requesting device 50 or the data device 14 (thereby providing a third level of security). In some examples, this may prevent an unauthorized entity from listening, capturing, or otherwise accessing the data 30.

As is illustrated, the system 10 includes the data device 14. The data device 14 may be any device that stores data 30 and/or transmits data 30 in response to a request. For example, the data device 14 may be (or may include) a network server, any suitable remote server, a mainframe, a host computer, a workstation, a web server, a personal computer, a laptop, a mobile telephone (such as a Smartphone), an electronic notebook, a personal digital assistant, a file server, any other computing or processing device, any other device for storing data and/or transmitting that data in response to a request, or any combination of the preceding. The functions of data device 14 may be performed by any suitable combination of one or more servers or other components at one or more locations. In an example where the data device 14 is a server, the server may be a private server, and the server may be a virtual or physical server. The server may include one or more servers at the same or remote locations. Also, data device 14 may be (or may include) any suitable component that functions as a server. As is illustrated in FIGS. 1A-1B, the data device 14 is one or more servers. Furthermore, as is also illustrated in FIG. 1B, the data device 14 may include a computer/data processor 18 and data storage medium 22 comprising instructions 26 executable by the processor 18 to perform the functions of the data device 14. Additionally, the data device 14 may include a communication port 46 (e.g., receiver, transmitter, transceiver) configured to receive and transmit information (e.g., receive requests for data 30, transmit the requested data 30, etc.). Further example details of data device 14 and/or its components are discussed below.

As is discussed above, the data device 14 may be any device that stores data 30 and/or transmits data 30 in response to a request. This data 30 represents any type of information. For example, the data 30 may be a document (e.g., a word document, an excel spreadsheet, a pdf), an audio file (e.g., a music file), a video file (e.g., a movie file, a tv show file, a video clip), a streaming audio file, a streaming video file, a list of available video files, a list of available audio files, account information, medical information, any other type of information, or any combination of the preceding. As is illustrated in FIGS. 1A-1B, the data 30 is a streaming video file. The streaming video file is a movie file that may be streamed to the requesting device 50, thereby allowing the user of the requesting device 50 to watch the movie without waiting for the full movie to download, in some examples. The data device 14 may store any amount of data 30. For example, the data device 14 may be associated with a video streaming service (e.g., NETFLIX, REDBOX, AMAZON VIDEO). In such an example, the data device 14 may store (or may be able to access) any and all video files available through the video streaming service.

The data device 14 may have one or more encryption methods 34 that may be used to encrypt the data 30. An encryption method 34 represents any type of encryption method that may be utilized to encrypt data and/or decrypt encrypted data. For example, an encryption method 30 may be RSA, Data Encryption Standard (DES), triple DES (DESS), Advanced Encryption Standard (AES), AES-256, Cryptographic hash functions, Message authentication codes (MACs), symmetric encryption methods, any other method of encryption, or any combination of the preceding. The data device 14 may have any number of encryption methods 34, each of which may be used to encrypt and/or decrypt data.

In some examples, one or more encryption keys (e.g., random strings of bits created for scrambling and unscrambling data) are used with the encryption method(s) 34 to encrypt data and/or decrypt encrypted data. However, the data device 14 may not have any encryption keys stored on disk, in some examples. Instead, in some examples, the data device 14 may generate an encryption key in real-time prior to encryption of the data. In some examples, this real-time generation of the encryption key may cause the encryption key to only be stored in transient memory, as opposed to being stored on disk. Furthermore, once the encryption key is used by the data device 14, the encryption key may be deleted (e.g., deleted from transient memory) or otherwise destroyed. This may prevent the encryption key(s) from being compromised if an unauthorized entity were to access the requesting device 50.

The data device 14 may have one or more storage decoder values 38. A storage decoder value 38 may be any type of value that represents all or a portion of an encryption key. For example, a storage decoder value 38 may be a binary value that represents all or a portion of an encryption key, a hexadecimal value that represents all or a portion of an encryption key, any other value that represents all or a portion of an encryption key, or any combination of the preceding. As an example, an encryption key may be made up of one or more bytes of data (e.g., 256 bytes of data).

Each byte of the encryption key may be represented by a binary value ranging from 00000000 to 11111111. In such an example, the storage decoder values 38 may include each binary value ranging from 00000000 to 11111111. This may allow the data device 14 to have a storage decoder value 38 for each value that a byte of the encryption code could be.

Alternatively (or additionally), each byte of the encryption key may be represented by a hexadecimal value ranging from 00 to FF. In such an example, the storage decoder values 38 may include each hexadecimal value ranging from 00 to FF. This may also allow the data device 14 to have a storage decoder value 38 for each value that a byte of the encryption code could be.

The data device 14 may have one or more storage tokens 42 (e.g., a set of one or more storage tokens 42). These storage tokens 42 may be used to tokenize the encryption key used by the data device 14. As a result of tokenizing the encryption key, the data device 14 may not transmit the actual encryption key to the requesting device 50. Instead, the data device 14 may transmit the storage tokens 42 to the requesting device 50. The requesting device 50 may then use these received storage tokens 42 to determine the encryption key.

A storage token 42 may be associated with a storage decoder value 38, as is illustrated by associations 204 in FIG. 2. For example, the storage token 42 may be uniquely identified by the storage decoder value 38. A storage decoder value 38 may uniquely identify only a single storage token 42. In such an example, if the data device 14 includes a first storage decoder value 38 (e.g., the hexadecimal value 00) and further includes a second storage decoder value 38 (e.g., the hexadecimal value 01), each storage decoder value 38 will have a different storage token 42 that is uniquely identified by the particular storage decoder value 38.

Although a storage token 42 may be associated with a particular storage decoder value 38, in particular examples, the storage token 42 may not include any information about the storage decoder value 38 (e.g., the storage token 42 may not include the "00" hexadecimal value in the storage token 42). As such, even if an unauthorized user was able to gain access (or steal) a storage token 42, the unauthorized user would be unable to determine the storage decoder value 38 or the portion of the encryption key that the storage decoder value 38 represents (e.g., the unauthorized user would be unable to determine the "00" hexadecimal value of the encryption key).

The storage token 42 may be any type of data that may be associated with the storage decoder value 38. For example, the storage token 42 may be a set of numbers, a set of letters (e.g., A, B, C, etc.), a set of numbers and letters, a set of symbols (e.g., %, !, ?, etc.), a code, any other grouping of characters, or any combination of the preceding. The storage token 42 may have any length. For example, the storage token 42 may be an eight character identifier, a sixteen character identifier, a 32 character identifier, an identifier with a length between eight characters and 32 characters, or have any other length. A storage token 42 may match a receiving token 70 stored on the requesting device 50. For example, a storage token 42 may be "58U48" and the matching receiving token 70 may also be "58U48".

Data device 14 may use any manner to create an association 204 between a particular storage token 42 (e.g., storage token 42a, b, or c) and a particular storage decoder value 38 (e.g., storage decoder value 38a, b, or c). As an example, data device 14 (or some other device) may include a pointer in the particular storage token 42 that identifies the particular decoder value 38 (or vice versa, or both). As another example, data device 14 may utilize a look-up table that associates the particular storage token 42 with the particular decoder value 38.

As is illustrated, the system 10 further includes the requesting device 50. The requesting device 50 may be any device that requests and/or processes data 30. For example, the requesting device 50 may be (or may include) a personal computer, a laptop, a mobile telephone (such as a Smartphone), an electronic notebook, a personal digital assistant, a cable box, a networked television (such as a smart television), a host computer, a workstation, a web server, a network server, any suitable remote server, a mainframe, a file server, any other computing or processing device, any other device that requests and/or processes data 30, or any combination of the preceding. As is illustrated in FIGS. 1A-1B, the requesting device 50 is a Smartphone. Furthermore, as is also illustrated in FIG. 1B, the requesting device 50 may include a computer/data processor 54 and data storage medium 58 comprising instructions 62 executable by the processor 54 to perform the functions of the requesting device 50. Additionally, the requesting device 50 may include a communication port 74 (e.g., receiver, transmitter, transceiver) configured to receive and transmit information (e.g., transmit requests for data 30, receive the requested data 30). Further example details of requesting device 50 and/or its components are discussed below.

The requesting device 50 may have one or more encryption methods 34 that may be used to decrypt the data 30. The encryption methods 34 stored on the requesting device 50 may be the same as the encryption methods 34 stored on the data device 14. As such, the data device 14 may encrypt data 30 using a particular encryption method 34, and the requesting device 50 may decrypt the encrypted data 30 using the same particular encryption method 34. The requesting device 50 may have any number of encryption methods 34, each of which may be used to encrypt and/or decrypt data.

As is discussed above, in some examples, one or more encryption keys are used with the encryption method(s) 34 to encrypt data 30 and/or decrypt encrypted data 30. However, the requesting device 50 may not have any encryption keys stored on disk, in some examples. Instead, in some examples, the requesting device 50 may re-create an encryption key using the storage tokens 42 received from the data device 14. In some examples, this re-creation of the encryption key may cause the encryption key to only be stored in transient memory, as opposed to being stored on disk. Furthermore, once the encryption key is used to decrypt the encrypted data 30, the encryption key may be deleted (e.g., deleted from transient memory) or otherwise destroyed. This may prevent the encryption key(s) from being compromised if an unauthorized entity were to access the requesting device 50.

The requesting device 50 may have one or more receiving decoder values 66. A receiving decoder value 66 may be any type of value that represents all or a portion of an encryption key. For example, a receiving decoder value 66 may be a binary value that represents all or a portion of an encryption key, a hexadecimal value that represents all or a portion of an encryption key, any other value that represents all or a portion of an encryption key, or any combination of the preceding.

The receiving decoder values 66 stored on the requesting device 50 may be the same as the storage decoder values 38 stored on the data device 14. For example, if the storage decoder values 38 on the data device 14 include each binary value ranging from 00000000 to 11111111, the receiving decoder values 66 stored on the requesting device 50 may also include each binary value ranging from 00000000 to 11111111. As another example, if the storage decoder values 38 stored on the data device 14 include each hexadecimal value ranging from 00 to PP, the receiving decoder values 66 stored on the requesting device 50 may also include each hexadecimal value ranging from 00 to FF.

The requesting device 50 may also have one or more receiving tokens 70 (e.g., a set of one or more receiving tokens 70). These receiving tokens 70 may be used to de-tokenize the encryption key. By de-tokenizing the encryption key, the requesting device 50 may be able to determine the encryption key that was used by the data device 14 to encrypt the data 30. As such, the requesting device 50 may be able to determine the encryption key without the actual encryption key being transmitted to the requesting device.

A receiving token 70 may be associated with a receiving decoder value 66, as is illustrated by associations 208 in FIG. 2. For example, the receiving token 70 may uniquely identify a storage decoder value 66. A receiving token 70 may be a unique identifier for only a single storage decoder value 66. In such an example, if the requesting device 50 includes a first receiving decoder value 66 (e.g., the hexadecimal value 00) and further includes a second receiving decoder value 66 (e.g., the hexadecimal value 01), each receiving decoder value 66 will have a different receiving token 70 that uniquely identifies it. Although the receiving token 70 may be associated with a particular receiving decoder value 66, in particular examples, the receiving token 70 may not include any information about the receiving decoder value 66 (e.g., the receiving token 70 may not include the "00" hexadecimal value in the receiving token 70). As such, even if an unauthorized user was able to gain access (or steal) a receiving token 70, the unauthorized user would be unable to determine the receiving decoder value 66 or the portion of the encryption key that the receiving decoder value represents (e.g., the unauthorized user would be unable to determine the "00" hexadecimal value of the encryption key).

The receiving token 70 may be any type of data that may be associated with the receiving decoder value 66. For example, the receiving token 70 may be a set of numbers, a set of letters (e.g., A, B, C, etc.), a set of numbers and letters, a set of symbols (e.g., %, !, ?, etc.), a code, any other grouping of characters, or any combination of the preceding. The receiving token 70 may have any length. For example, the receiving token 70 may be an eight character identifier, a sixteen character identifier, a 32 character identifier, an identifier with a length between eight characters and 32 characters, or have any other length. A receiving token 70 may match a storage token 38 stored on data device 14. For example, a receiving token 70 may be "58U48" and the matching storage token 38 may also be "58U48". Additionally, a matching receiving decoder value 66 and storage decoder value 38 may each be respectively associated with a receiving decoder value 66 and a storage decoder value 42 that also match. For example, a receiving token 70 (e.g., "58U48") may be associated with a receiving decoder value 66 (e.g., the hexadecimal value 00), both of which match a storage token 42 (e.g., "58U48") and its associated storage decoder value 38 (e.g., the hexadecimal value 00).

Requesting device 50 may use any manner to create an association 208 between a particular receiving token 70 (e.g., receiving token 70a, b, or c) and a particular receiving decoder value 66 (e.g., receiving decoder value 66a, b, or c). As an example, requesting device 50 (or some other device) may include a pointer in the particular receiving token 70 that identifies the particular receiving decoder value 66 (or vice versa, or both). As another example, requesting device 50 may utilize a look-up table that associates the particular receiving token 70 with the particular receiving decoder value 66.

Modifications, additions, or omissions may be made to system 10 without departing from the scope of the disclosure. For example, system 10 may include any number of data devices 14 and/or requesting devices 50 (and/or any number of components, such as processors or memory units illustrated or described in the above devices). Also, any suitable logic may perform the functions of system 10 and the components and/or devices within system 10. Furthermore, one or more components of system 10 may be separated, combined, and/or eliminated.

Additionally, although the data device 14 and requesting device 50 have been described above as having or storing information (e.g., storing data 30, storing tokens 42 and 70), in some examples, some of that information may not be stored by the data device 14 or the requesting device 50. Instead, the data device 14 and requesting device 50 may merely have access to that information (e.g., the information is stored elsewhere). For example, data device 14 may not store the data 30 that is requested. Instead, data device 14 may be able to access that data 30, and then data device 14 may transfer it to the requesting device 50.

FIG. 3 illustrates an example method for securely transferring data. As is illustrated, method 300 of FIG. 3 illustrates an example of securely transferring data 30 from data device 14 to requesting device 50 of FIGS. 1A-1B. However, the steps of method 300 may be utilized to securely transfer data 30 (or any other data) from any device to any other device.

Method 300 beings at step 304. At step 308, a connection is established between data device 14 and the requesting device 50. The connection may refer to any type of connection that allows the data device 14 to communicate with the requesting device 50 (and vice versa) so as to transfer data 30, in some examples. In some examples, the connection may refer to (or include) an authentication procedure. For example, in order to receive data 30 from a data device 14, the requesting device 50 may authenticate itself to the data device 14. As an example of this, the requesting device 50 may log into an account established with the data device 14.

In an example where the data device 14 is associated with a service, such as a file streaming service (e.g., NETFLIX), the user of the requesting device 50 may have an account with the service. In such an example, the connection may refer to (or include) the requesting device 50 logging into an account associated with the data device 14 using, for example, an account name and password. By logging into an account associated with the data device 14, the user of the requesting device 50 may be able to view the data 30 that is available to the user (e.g., a list of video files, the list of audio files).

In some examples, the connection process between the data device 14 and the requesting device 50 may include a pairing process. The pairing process may be any process that synchronizes the requesting device 50 with the data device 14. For example, the pairing process may involve sending one or more messages between the requesting device 50 and the data device 14 in order to synchronize the requesting device 50 with the data device 14. Such synchronization may include checking or verifying that both the requesting device 50 and the data device 14 have one or more of the same encryption methods 34, that the requesting device 50 and the data device 14 have matching storage decoder values 38 and receiving decoder values 66 (e.g., each have binary values ranging from 00000000 to 11111111, each have hexadecimal values ranging from 00 to FF), any other manner of synchronizing the requesting device 50 with the data device 14, or any combination of the preceding.

In some examples, if the requesting device 50 or the data device 14 is missing information used for synchronization (e.g., the requesting device 50 does not have receiving decoder values 66 that match the storage decoder values 38 of the data device 14), the pairing process may cause the requesting device 50 or the data device 14 to generate the missing information, download the information, otherwise retrieve the missing information, or any combination of the preceding.

In some examples, the synchronization process may further include a synchronization of one or more counters included in the data device 14 and the requesting device 50. This synchronization of counters may allow the data device 14 and requesting device 50 to select the same encryption method 34 to use with a particular transfer of data 30, in some examples. For example, the synchronization of counters may allow the data device 14 and requesting device 50 to both independently select the same first encryption method 34 (e.g., AES) to use for the transfer of first data 30 (e.g., a first portion of a streaming movie file). Furthermore, the synchronization of counters may allow the data device 14 and requesting device 50 to both independently select to use the same second encryption method 34 (e.g., DES3) for the transfer of second data 30 (e.g., a second portion of a streaming movie file).

In some examples, the synchronization of counters may allow the data device 14 and requesting device 50 to generate storage tokens 42 that match receiving tokens 70. For example, the synchronization of counters may allow the data device 14 and requesting device 50 to both independently generate a matching storage token 42 or a matching receiving token 70 (e.g., "58U48") for a matching storage decoder value 38 or a matching receiving decoder value 66 (e.g., the hexadecimal value 00).

At step 312, one or more tokens may be generated. In some examples, the data device 14 may generate storage tokens 42, and the requesting device 50 may generate receiving tokens 70. The data device 14 may generate a storage token 42 for each storage decoder value 38. Furthermore, this generated storage token 42 may be associated its respective storage decoder value 38 (e.g., the storage decoder value 38 may uniquely identify the storage token 42). As an example of this, if the data device 14 has 256 different storage decoder values 38 (e.g., the hexadecimal values 00 to FF), the data device 14 may generate 256 different storage tokens 70, with each storage token 42 being associated with a different storage decoder value 38. In such an example, the data device 14 may generate: (a) a first storage token 42a (e.g., "58U48") that is uniquely identified by a first storage decoder value 38a (e.g., the hexadecimal value 00); (b) a second storage token 42b (e.g., "U9GH6") that is uniquely identified by a second storage decoder value 38b (e.g., the hexadecimal value 01); (c) a third storage token 42c (e.g., "1O89Z") that is uniquely identified by a third storage decoder value 38c (e.g., the hexadecimal value 02); and so on.

The requesting device 50 may also generate a receiving token 70 for each receiving decoder value 66. Furthermore, this generated receiving token 70 may uniquely identify its respective receiving decoder value 66. As an example of this, if the requesting device 50 has 256 different receiving decoder values 66 (e.g., the hexadecimal values 00 to FF), the requesting device 50 may generate 256 different receiving tokens 70, with each receiving token 70 being associated with a different receiving decoder value 66. In such an example, the requesting device 50 may generate: (a) a first receiving token 70a (e.g., "58U48") that uniquely identifies a first receiving decoder value 66a (e.g., the hexadecimal value 00); (b) a second receiving token 70b (e.g., "U9GH6") that uniquely identifies a second receiving decoder value 66b (e.g., the hexadecimal value 01); (c) a third receiving token 70c (e.g., "1O89Z") that uniquely identifies a third receiving decoder value 66c (e.g., the hexadecimal value 02); and so on.

As is discussed above, the generated storage tokens 42 and the generated receiving tokens 70 may match. Furthermore, a matching storage token 42 and a matching receiving token 70 may each uniquely identify (or be uniquely identified by) a storage decoder value 38 or a receiving decoder value 66 that also both match. For example, a first storage token 38a (e.g., "58U48") that is uniquely identified by a first storage decoder value 38a (e.g., the hexadecimal value 00) may match a first receiving token 70a (e.g., "58U48") that uniquely identifies a first receiving decoder value 66a (e.g., the hexadecimal value 00). In such an example, the first storage decoder value 38a and the first receiving decoder value 66a also match (e.g., they are both the hexadecimal value 00).

The tokens (e.g., storage tokens 42 and receiving tokens 70) may be generated in any manner. For example, the tokens may be generated by a token generator method. Such a token generator method may receive an input, and may utilize the input to generate a token having any length and/or any character type. The tokens may be generated in any manner that results in matching storage tokens 42 and receiving tokens 70. For example, both the data device 14 and requesting device 50 may utilize the same token generator method (and the same input, in some examples) to generate their respective matching tokens 42 and 70. In such an example, the pairing process (discussed above) may allow the data device 14 and requesting device 50 to select the same token generator method. Furthermore, the synchronization of counters may allow the data device 14 and requesting device 50 to select the same input for the token generator method. Thus, the token generator methods on both the data device 14 and the requesting device 50 may generate matching tokens 42 and 70.

In some examples, the tokens 42 and 70 may be generated in real time (e.g., generated only when the tokens 42 and 70 are needed for a secure transfer of data 30). This may prevent the tokens 42 and 70 from having to be stored on disk for long period of times. Instead, the tokens 42 and 70 may only be stored on disk for the amount of time it takes to securely transfer data 30 (e.g., the time it takes to securely transfer a portion of a streaming video file).

Although the tokens 42 and 70 are described above as being generated (e.g., generated in real-time), in some examples, the tokens 42 and 70 may be determined. A token may be determined by being generated (as is discussed above). Alternatively, a token may be determined in any other manner. For example, a token may be determined by selecting the token from a group of stored tokens. As an example, the data device 14 may have thousands (or millions, or any other number) of storage tokens 42 stored on disk or accessible to the data device 14 (e.g., stored on a memory unit that the data device 14 has access to). In such an example, the data device 14 may determine a particular storage token 42 by selecting it from these thousands (or millions, or any other number) of possible storage tokens 42.

Also, the requesting device 50 may have matching possible receiving tokens 70. In this example, the particular storage token 42 selected by the data device 14 may match the particular receiving token 70 selected by the requesting device 50. This selection of matching tokens 42 and 70 may be performed in any manner (e.g., a selection based on a synchronization of the counters, as is discussed above).

At step 316, the requesting device 50 may transmit a request for data 30 to the data device 14. The request for data 30 may be transmitted as a result of a user of the requesting device 50 requesting the data 30. For example, where the data device 14 is associated with a service, such as a file streaming service (e.g., NETFLIX), the request for data 30 may be transmitted as a result of the user selecting a particular file (e.g., selecting a particular movie from a list of movies offered by the service). The request may be for any amount of data 30. For example, the request may be for an entire document, file, or set of information (e.g., an entire song, an entire movie, an entire spreadsheet). As another example, the request may be for only a portion or chunk of the document, file, or set of information (e.g., a portion of a streamed song, a portion of a streamed movie, a portion of a spreadsheet).

The request for data 30 may be transmitted in any manner and over any communications network. For example, the request for data 30 may be transmitted over the Internet (e.g., using a TCP communications protocol), a Wi-Fi network, a cellular network, a radio telecommunication network, a Bluetooth network, a NFC network, any other wireless network, any wired network, any other manner of transmission, or any combination of the preceding.

Following transmission of the request for data 30, the data device 14 may receive the request for data 30 at step 320. In response to the request for data 30, the data device 14 may retrieve the requested data 30. For example, the data device 14 may retrieve the requested data 30 from data storage medium 58 or any other storage location.

Following receipt of the request for data 30, the data device 14 may generate an encryption key at step 324. As is discussed above, the encryption key may be any type of key that is used with one or more encryption methods 34 to encrypt data and/or decrypt data. The encryption key many be a random string of bits created for scrambling and unscrambling data. The encryption key may have any length, may have any characters, and may be generated using any method. For example, the encryption key may be generated using a random character generator.

The encryption key may be generated in real time (e.g., generated only when it is needed for a secure transfer of data 30). This may prevent the encryption key from having to be stored on disk. Instead, the encryption key may only be stored in transient memory, as opposed to being stored on disk. Furthermore, once the encryption key is used to encrypt the data 30, the encryption key may be deleted (e.g., deleted from transient memory) or otherwise destroyed. As such, the encryption key may be a one-time use encryption key that is destroyed after its use. This may prevent the encryption key from being compromised if an unauthorized entity were to access the data device 14.

Although the encryption key is described above as being generated (e.g., generated in real-time), in some examples, the encryption key may be determined. An encryption key may be determined by being generated (as is discussed above). Alternatively, an encryption key may be determined in any other manner. For example, an encryption key may be determined by selecting the encryption key from a group of stored encryption keys. As an example, the data device 14 may have thousands (or millions, or any other number) of encryption keys stored on disk or accessible to the data device 14 (e.g., stored on a memory unit that the data device 14 has access to). In such an example, the data device 14 may determine a particular encryption key by selecting it from these thousands (or millions, or any other number) of possible encryption keys. This selection of an encryption key may be performed in any manner (e.g., the selection may be random). Furthermore, because the data device 14 may store thousands (or millions, or any other number) of encryption keys, the vast number of possible encryption keys may prevent an unauthorized entity from determining which encryption key was used, even if the unauthorized entity were to gain access to the data device 14.

Following generation of the encryption key, the data device 14 may encrypt the requested data 30 at step 328. The requested data 30 may be encrypted in any manner using the encryption key. For example, the data device 14 may utilize the encryption key with one or more encryption methods 34 to encrypt the data. The encryption method(s) 34 used to encrypt the requested data 30 may be selected in any manner. For example, as is discussed above, the encryption method(s) 34 may be selected during the pairing process discussed above. This may, in some examples, allow the data device 14 and the requesting device 50 to select the same encryption method(s) 34 to use with the requested data 30.

Following encryption of the requested data 30, the data device 14 may determine one or more tokens for the encryption key at step 332. In some examples, the data device 14 may determine one or more storage tokens 42 for the encryption key. These determined storage tokens 42 may be used to more securely transmit the data 30 to the requesting device 50. For example, as is discussed above, the actual encryption key may not be sent to the requesting device 50. Instead, storage tokens 42 that represent the encryption key may be determined, and these storage tokens 42 may be sent to the requesting device 50. This may allow the requesting device 50 to determine the encryption key without the actual encryption key having to be transmitted. This may prevent the actual encryption key from being intercepted by an unauthorized entity who may be listening to the communications between the data device 14 and the requesting device 50, in some examples.

The storage tokens 42 may be determined in any manner. As an example of this, the storage tokens 42 may be determined using the encryption key and the storage decoder values 38. In such an example, the encryption key may first be broken up into key portions. A key portion may be any portion of the encryption key. For example, a key portion may be a nibble (4 bits) of an encryption key, a byte of an encryption key, two bytes of an encryption key, or any other portion of the encryption key. In some examples, when the key portion is a byte, and the encryption key is 256 bytes, then the encryption key may be broken up into 256 key portions.

After the encryption key is broken up into key portions, the data device 14 may determine a storage token 42 for each key portion. The storage tokens 42 for each key portion may be determined in any manner. For example, the storage tokens 42 for each key portion may be determined using the storage decoder values 38.

As is discussed above, the storage decoder values 38 may be any type of value that represents all or a portion of an encryption key. For example, a storage decoder value 38 may be a value that matches a key portion of the encryption key. As an example of this, a key portion of the encryption key may be a byte having a binary value of 00000000. In such an example, the data device 14 may have a storage decoder value 38 having a binary value of 00000000. As such, both binary values (e.g., 00000000) match each other. As another example of this, a key portion of the encryption key may be a byte having a hexadecimal value of 00. In such an example, the data device 14 may have a storage decoder value 38 having a hexadecimal value of 00. As such, both hexadecimal values (e.g., 00) match each other. In these examples, the data device 14 may search its storage decoder values 38 for a particular storage decoder value 38 that matches the key portion. Once a match is found, the data device 14 may select that particular storage decoder value 38 for that key portion.

Furthermore, the data device 14 may then use the selected storage decoder value 38 to determine the storage token 42 for the key portion. For example, as is also discussed above, each storage decoder value 38 may be associated with (e.g., it may uniquely identify) a particular storage token 42. In such an example, the data device 14 may use the selected storage decoder value 38a (e.g., a hexadecimal value of 00) to identify the first associated storage token 42a (e.g., "58U48") that is uniquely identified by that selected storage decoder value 38a. For example, the data device 14 may access or look up the selected storage decoder value 38, and based on the accessed storage decoder value 38 (and the association 204), the data device 14 may determine the storage token 42. As an example, the data device 14 may access a first selected storage decoder value 38a (e.g., a hexadecimal value of 00) and utilize association 204 to determine the associated storage token 42a (e.g., "58U48"). The data device 14 may then select that particular storage token 42 for the key portion.

This determination process may be conducted for each key portion of the encryption key. As an example of this, the encryption key may be the following: "000102". In this example, the encryption key is a three byte encryption key that may be broken up into three key portions: (a) the hexadecimal value 00; (b) the hexadecimal value 01; and (c) the hexadecimal value 02. These hexadecimal values may be used to identify matching storage decoder values 38, such as: (a) a first storage decoder value 38a having the hexadecimal value 00; (b) a second storage decoder value 38a having the hexadecimal value 01; and (c) a third storage decoder value 38a having the hexadecimal value 02. Then, the data device 14 may use these three storage decoder values 38 to identify the associated storage tokens 42 that are uniquely identified by each of these three storage decoder values 38, such as (a) a first storage token 42a of "58U48" that is uniquely identified by the first storage decoder value 38a; (b) a second storage token 42b of "U9GH6" that is uniquely identified by the second storage decoder value 38b; and (c) a third storage token 42c of "1O89Z" that is uniquely identified by the third storage decoder value 38c. These storage tokens 42 may be used in place of the actual encryption key. As such, instead of transmitting an encryption key of "000102", the data device 50 may transmit the storage tokens 42 (e.g., "58U48", "U9GH6", and "1O89Z"). Furthermore, in some examples, these storage tokens 42 may be combined to form a single value (e.g., "58U48U9GH61O89Z") which is then transmitted to the requesting device 50.

Following the determination of the storage tokens 42, the data device 14 may generate a packet at step 336. The packet may be generated in any manner. Furthermore, the packet may include any information for transmission to the requesting device 50. For example, the packet may include the encrypted requested data 30, and may further include the determined storage tokens 42 (e.g., in combined form). The packet may not, however, include the actual encryption key.

In some examples, the packet may include additional information. For example, the packet may include a header. The header of the packet may include an identification code (which may identify the packet as having been sent by the data device 14), a timestamp (which may identify the time and/or date the packet was created and/or transmitted by the data device 14, such as in a yyyy.dd.HH.mm.sss format), a parsing format identifier (which may identify how the packet was formed and how the data can be de-parsed), any other data, or any combination of the preceding.

As a further example, the packet may include one or more chaff tokens. A chaff token may refer to data that may imitate a storage token 42, but may not be an actual storage token 42. Instead, a chaff token may be a fake token that is meant to hide (or obfuscate) the real storage token 42. For example, as is discussed above, a storage token 42 may be "58U48", which matches a receiving token 70 of "58U48" (stored on requesting device 50). In such an example, a chaff token may be any other combination of characters (e.g., "97U3M", but which does not match any receiving token 70 stored on requesting device 50.

The chaff token(s) included in the packet may hide (or obfuscate) the real storage tokens 42. As an example, instead of a packet including only the character string "58U48" (i.e., only the storage token 42), the packet may include, for example, the character string "97U3M58U48P07HI" (i.e., the storage token 42 and chaff tokens), which further hides the storage token 42. As such, in some examples, an unauthorized entity intercepting the packet may be unable to separate the storage tokens 42 from the chaff tokens. Furthermore, the chaff tokens may also increase the size of the packet, which may cause an unauthorized entity to spend more time attempting to decipher the packet (if it is even possible). Therefore, even if the unauthorized entity may decipher the storage tokens 42 from the intercepted packet, it may already be too late for the unauthorized entity to use the storage tokens 42, as the system 10 may have already detected the unauthorized entity, or the requesting device 50 may have already received and/or utilized the storage tokens 42 to determine the encryption key and decrypt the data 30 (making the storage tokens 42 and/or the encryption key obsolete, for example).

The chaff token may by any data. For example, the chaff may be a set of numbers, a set of letters (e.g., A, B, C, etc.), a set of numbers and letters, a set of symbols (e.g., %, !, ?, etc.), a code, any other grouping of characters, or any combination of the preceding. In particular examples, the chaff token may have a similar format as a storage token 42. The chaff token may have any length. For example, the chaff token may be an eight character identifier, a sixteen character identifier, a 32 character identifier, an identifier with a length between eight characters and 32 characters, or have any other length. The chaff token may have the same length as a storage token 42, in some examples. Furthermore, one or more (or all) of the chaff tokens in a particular packet may have a different format and/or length than other chaff tokens in the particular packet.

The packet may include any number of chaff tokens. For example, the packet may include no chaff tokens, one chaff token, two chaff tokens, ten chaff tokens, 100 chaff tokens, 1,000 chaff tokens, 1 million chaff tokens, 10 million chaff tokens, or any other number of chaff tokens. Furthermore, each packet may include the same number of chaff tokens, or a different number of chaff tokens. The real storage tokens 42 may be included in any location (in the character string of the packet) in relation to the chaff tokens. For example, the real storage tokens 42 may each be surrounded by a chaff token on each side. Furthermore, the location of the real storage tokens 42 in relation to the chaff tokens may be random. As such, an unauthorized entity may be unable to determine which tokens are the real storage tokens 42 based on their location.

Following generation of the packet, the data device 14 may transmit the packet at step 340. The data device 14 may transmit the packet to the requesting device 50. The data device 14 may transmit the packet in any manner and over any communications network. For example, the data device 14 may transmit the packet over the Internet (e.g., using a TCP communications protocol), a Wi-Fi network, a cellular network, a radio telecommunication network, a Bluetooth network, a NFC network, any other wireless network, any wired network, any other manner of transmission, or any combination of the preceding.

Following transmittal of the packet, the requesting device 50 may receive the packet at step 344. After receiving the packet, the requesting device 50 may determine whether the packet is legitimate. The requesting device 50 may determine whether the packet is legitimate in any manner. As an example, the requesting device 50 may analyze the header of the packet to determine whether or not the header of the packet includes an identification code that identifies the packet as having been sent by the data device 14. In some examples, if the packet is determined to not be legitimate, the packet may be disregarded by the requesting device 50, and the requesting device 50 may request the data 30 again.

Following reception of the packet, the requesting device 50 may determine the encryption key in step 348. The requesting device 50 may determine the encryption key in any manner. As an example of this, the requesting device 50 may determine the encryption key using the storage tokens 42 included in the packet, and further using the receiving tokens 70 and receiving decoder values 66. In such an example, the requesting device 50 may first determine the storage tokens 42 included in the packet. The requesting device 50 may determine the storage tokens 42 included in the packet in any manner. For example, if the packet does not include any chaff tokens, the requesting device 50 may parse the packet to determine the storage tokens 42.

As another example, if the packet does include chaff tokens, the requesting device 50 may de-parse the packet and filter out the chaff tokens in order to determine the storage tokens 42. De-parsing the packet may refer to breaking up the information in the packet into potential tokens, or otherwise identifying potential tokens. For example, the information in the packet (other than the header and the data 30, for example) may include the following string of characters: "97U3M58U48P07HIU9GH6PLQ321O89Z". In such an example, de-parsing this header may identify six potential tokens: (1) "97U3M"; (2) "58U48"; (3) "P07HI"; (4) "U9GH6"; (5) "PLQ32"; and (6) "1O89Z". The requesting device 50 may de-parse the packet in any manner. In some examples, the requesting device 50 may have one or more parsing methods that may allow the requesting device 50 to de-parse the packet into potential tokens. For example, a parsing method may provide a format and/or length of each token (e.g., one token is 5 characters of the data, one token is 32 characters of the data, one token has the format xxxx-xxx-xxxx-xxxxxxxxx, one token has the characters "A" and "X" as the first and fourth characters), allowing the requesting device 50 to de-parse the packet based on the format and/or length of the tokens. As another example, a parsing method may provide a character pattern in-between tokens (e.g., fake characters that indicate a token, such as the first 2 characters are fake and the last 3 characters are fake).

The parsing method used to de-parse the packet may always be the same. On the other hand, the parsing method used to de-parse the packet may differ based on the particular parsing method used to create the packet. For example, both the data device 14 and the requesting device 50 may have more than one parsing method (e.g., 3 parsing methods, 5 parsing methods) to choose from in generating the packet and de-parsing the packet. In such an example, the requesting device 50 may use the same parsing method to de-parse the packet as the data device 14 used to form the packet. Furthermore, in such an example, the data device 14 may generate the packet using a particular parsing method, and may further add an identifier of that parsing method into the header of the packet (e.g., the parsing format identifier discussed above). The requesting device 50 may use this parsing format identifier to determine which parsing method to use, and may then use that parsing method to de-parse the packet. As another example, the same parsing method may be independently selected by both the data device 14 and the requesting device 50 during the pairing process (discussed above).

Following the de-parsement of the packet, the requesting device 50 may filter out the chaff tokens in order to determine the storage tokens 42. The requesting device 50 may filter out the chaff tokens in any manner. For example, the requesting device 50 may compare each potential token (determined above) to each of its receiving tokens 70 in order to determine if there are any matches. If a potential token does not match any of the receiving tokens 70, the potential token may be determined to be a chaff token, and may be filtered out. On the other hand, if a potential token does match a receiving token 70, the potential token may be determined to be a storage token 42.

Following the determination of the storage tokens 42 included in the packet, the requesting device 50 may match each determined storage token 42 to one of its receiving tokens 70. The requesting device 50 may match a storage token 42 to one of its receiving tokens 70 in any manner. For example, the requesting device 50 may compare the storage token 42 to each of the receiving tokens 70 in order to determine if there are any matches. The storage token 42 may match a receiving token 70 if the two tokens are identical (e.g., "58U48" and "58U48"). As another example, the storage token 42 may match a receiving token 70 if the receiving token 70 includes at least all of the characters of the storage token 42 (or vice versa) (e.g., "58U48" and "58U4878910"). As further examples, the storage token 42 may match a receiving token 70 if the two tokens are opposite (e.g., "up" and "down"), if the two tokens complement or complete each other (e.g., "12345" and "6789"), if one token asks a question and the other token correctly answers it, any other manner of matching, or any combination of the preceding. In particular embodiments, the step of matching the storage token 42 to a receiving token 70 may already be a part of the step of determining a storage token 42 (as is discussed above with regard to matching potential tokens to the receiving tokens 70). In such examples, the step of matching the storage token 42 to a receiving token 70 may not be repeated. Instead, the initial match may be used.

Following the matching of the storage tokens 42 to receiving tokens 70, the requesting device 50 may determine key portions of the encryption key based on the matching receiving tokens 70, and further based on the associated storage decoder values 66. The requesting device 50 may make this determination in any manner. For example, as is discussed above, a receiving token 70 may be associated with a storage decoder value 66 (e.g., it may uniquely identify the storage decoder value 66). In such an example, the requesting device 50 may utilize the matching receiving tokens 70 to determine the associated storage decoder values 66. For example, the requesting device 50 may access or look up a matching receiving token 70, and based on the accessed receiving token 70 (and the association 208), the requesting device 50 may determine the storage decoder value 66. As an example, the requesting device 50 may access a first matching receiving token 70*a* (e.g., "58U48") and utilize association 208 to determine the associated storage decoder value 66*a* (e.g., a hexadecimal value of 00). This determination may be performed for each of the matching receiving tokens 70, resulting in a determination of a storage decoder value 66 for each matching receiving token 70.

The requesting device 50 may then utilize the determined storage decoder values 66 to determine the key portions of the encryption key. For example, each determined receiving decoder value 66 may be a value that matches a key portion of the encryption key. As an example of this, a determined receiving decoder value 66 may have a binary value of 00000000. In such an example, this binary value (e.g., 00000000) may be determined to be a key portion of the encryption key. Thus, the key portion may be determined to be a byte having the binary value of 00000000, for example. As another example, a determined receiving decoder value 66 may have a hexadecimal value of 00. In such an example, this hexadecimal value (e.g., 00) may be determined to be a key portion of the encryption key. Thus, the key portion may be determined to be a byte having the hexadecimal value of 00. In some examples, this determination of a key portion may be performed for each determined receiving decoder value 66.

Following the determination of the key portions, the requesting device 50 may determine the encryption key using the key portions. The requesting device 50 may determine the encryption key in any manner using the key portions. As an example, the requesting device 50 may re-assemble the key portions into the encryption key. The requesting device 50 may re-assemble the key portions into the encryption key in any manner. For example, the requesting device 50 may combine all of the key portions together to form the encryption key. As an example of this, the requesting device 50 may have determined the following key portions: (a) a first key portion having the hexadecimal value 00; (b) a second key portion having the hexadecimal value 01; and (c) a third key portion having the hexadecimal value 02. In such an example, these three key portions may be combined to form the following three byte encryption key: "000102".

The order in which the key portions are combined to form the encryption key may be based on the order of storage tokens 42 included in the packet. For example, if a storage token 42 was the first token (or the third token) included in the packet, the key portion determined using that storage token 42 may be the first key portion (or the third key portion) in the combination. As another example, the order in which the key portions are combined to form the encryption key may be based on a method that was determined during the pairing process (discussed above).

Following the determination of the encryption key, the requesting device 50 may de-crypt the encrypted requested data 30 at step 352. The requesting device 50 may utilize the determined encryption key to de-crypt the encrypted requested data 30. The encrypted requested data 30 may be de-crypted in any manner using the encryption key. For example, the requesting device 50 may utilize the encryption key with the same encryption method 34 that was used by the data device 14 to originally encrypt the data 30. In some examples, the requesting device 50 may select this same encryption method 34 during the pairing process discussed above. In other examples, the requesting device 50 may select this same encryption method 34 based on an identifier included in the packet, itself.

Following the de-cryption of the encrypted requested data 30, the requesting device 50 may transmit the requested data 30 for use at step 356. In some examples, the requesting device 50 may transmit the requested data 30 to the user of the requesting device 50. In such an example, the transmission of the requested data 30 may refer to a transmission that causes the data 30 to be displayed on a display screen (e.g., displayed on a display screen of a mobile device), and/or a transmission that causes the data 30 to be output to another user interface (e.g., output as sound from speakers or earphones of a mobile device). As such, the user may view, listen to, or otherwise access the data 30. In other examples, the requesting device 50 may transmit the requested data 30 for use by the requesting device 50. For example, the requested data 30 may be transmitted to an "app" or other program that is being executed by the processor of the requesting device 50. This may allow the "app" or other program to use or otherwise access the requested data 30. In additional examples, the requesting device 50 may transmit the requested data to another device (e.g., a television that will display the requested data 30, a speaker that will play the requested data 30, another computer or mobile phone that originally requested the data 30 from the requesting device 50). In other examples, the transmission of the requested data 30 may refer to any other manner in which the requesting device 50 may utilize the requested data 30.

Following the transmission of the requested data 30, the requesting device 50 may determine whether to request additional data at step 360. The requesting device 50 may determine whether to request additional data 30 for any reason. For example, the requesting device 50 may determine that it should request additional data 30 as a result of a user of the requesting device 50 (or an "app" or other program installed on the requesting device 50) selecting to request additional data 30. As an example of this, the user may have selected a new document to review, may have selected a new movie to watch, or may have selected a new song to purchase. As another example, the requesting device 50 may determine that it should request additional data 30 if the originally requested data 30 is finished or almost finished being used. As an example of this, the originally requested data 30 may be one or more chunks or portions of a streaming video file. When those chunks are done being watched (or are close to being done), the requesting device 50 may determine that the next chunk(s) of the streaming video file are needed in order to continue the streaming process. In such an example, the requesting device 50 may determine (e.g., automatically determine) to request the additional data 30 (e.g., the additional chunk(s) of the streaming video file). Furthermore, this may continue until the full streaming video file is done being watched, or until the user decides to stop watching the streaming video file.

If it is determined at step 360 that additional data should not be requested, the method 300 may move to step 364, where the method 300 ends. On the other hand, if it is determined that additional data 30 should be requested, the method 300 may move back up to step 316, where the requesting device 50 requests the additional data 30. Then the method 300 may re-perform steps 316-356 so as to securely transfer the additional data 30.

Although the method 300 may re-perform steps 316-356, it may do so using different storage tokens 42, different receiving tokens 70, and a different encryption key. As such, even if an unauthorized entity were to determine the storage tokens 42, receiving tokens 70, encryption key, and/or data 30 from the previous transmission, these determinations would not help the unauthorized entity in subsequent transmission of data 30.

In order to utilize different tokens 42 and 70, both the data device 14 and the requesting device 50 may generate (or determine) new tokens 42 and 70. This generation may be similar to step 312 discussed above. For example, in order to generate new storage tokens 42, the data device 14 may generate a storage token 42 for each storage decoder value 38. Furthermore, this generated storage token 70 may be uniquely identified its respective storage decoder value 38, as is discussed above. Additionally, in order to generate new receiver tokens 70, the requesting device 50 may generate a receiving token 70 for each receiving decoder value 66. Furthermore, this generated receiving token 70 may uniquely identify its respective receiving decoder value 66. Additionally, each generated storage token 42 may match a generated receiving token 70, as is discussed above.

The generation of new tokens 42 and 70 may occur at any time after the use of the old tokens 42 and 70. For example, the data device 14 may generate new storage tokens 42 after (e.g., immediately after) the data device 14 inserts the old storage tokens 42 into a packet for transmission to the requesting device 50, after (e.g., immediately after) the data device 14 transmits the packet to the requesting device, after (e.g., immediately after) the data device 14 receives a confirmation message indicating that the requesting device 50 has received the packet, or any other time after the use of the old storage tokens 42 but prior to the use of the new storage tokens 42. As another example, the requesting device 50 may generate new receiving tokens 70 after (e.g., immediately after) the requesting device 50 uses the old receiving tokens 70 to determine associated receiving decoder values 66, after (e.g., immediately after) the requesting device 50 determines key portions for the encryption key, after (e.g., immediately after) the requesting device 50 determines the encryption key, after (e.g., immediately after) the requesting device 50 de-crypts the encrypted requested data 30, after (e.g., immediately after) the requesting device 50 transmits the requested data 30 for use, or any other time after the use of the old receiving tokens 70 but prior to the use of the new receiving tokens 70.

In some examples, by generating (or otherwise determining) new tokens 42 and 70, the old tokens 42 and 70 may become obsolete. As such, even if an unauthorized entity were to determine the old tokens 42 and 70, these determinations would not help the unauthorized entity in subsequent transmissions of data 30. In some examples, the same applies to the generation (or determination) of a new encryption key (which may occur in step 324, and which renders the old encryption key obsolete). Even if an unauthorized entity were to determine the old encryption key, this determination would not help the unauthorized entity in subsequent transmissions of data 30.

Modifications, additions, or omissions may be made to method 300. For example, although the steps of method 300 are described above as being performed by data device 14 or requesting device 50, in some examples, one or more of the steps of method 300 may be performed by any other device.

As another example, one or more steps of method 300 may be optional, or may not be performed. For example, method 300 may not include step 308, where a connection is established. Instead, communication between the data device 14 and requesting device 50 may begin when the requesting device 50 requests data 30. As a further example, the steps of method 300 may be performed in parallel or in any suitable order.

Additionally, although method 300 is described above as generating (or otherwise determining) a single storage token 42 for association with each storage decoder value 38, in some examples, any number of storage tokens 42 may be generated (or otherwise determined) for association with each storage decoder value 38. Similarly, any number of receiving tokens 70 may be generated (or otherwise determined) for association with each receiving decoder value 66. As an example of this, the data device 14 may generate a set of 10 different storage tokens 42 to associate with each storage decoder value 38, and the requesting device 50 may generate a set of 10 different receiving tokens 70 to associate with each receiving decoder value 66. In such an example, the data device 14 may select one of these 10 different storage tokens 42 to insert into the packet in steps 332-336. In some examples, this may allow the data device 14 to utilize different storage tokens 42 when the same value (e.g., the same binary value, the same hexadecimal value) is included multiple times in the same encryption key. In some examples, this may alternatively (or additionally) allow the data device 14 to further secure the data 30, as an unauthorized entity may have to determine or access all 10 different storage tokens 42 for each storage decoder value 38, not just one.

In various embodiments, the herein described systems, devices (e.g., date device 14, requesting device 50), components of the devices, and methods may be implemented in software, firmware, or executable instructions stored in a data storage medium such as or including machine-readable medium. The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. Some examples may be implemented using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. Computers and computer systems described herein (e.g., data device 14, requesting device 50) may include operatively associated computer-readable memory media such as memory for storing software applications and instructions used in obtaining, processing, storing or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), or other like computer-readable media. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like.

It will be further apparent to one of ordinary skill in the art that some of the examples as described hereinabove may be implemented in many different examples of instruction (e.g., software or firmware) and hardware. The instructions may include any suitable type of code, such as source code, compiled code, interpreted code, executable code, static code, dynamic code, and the like. The actual software code or specialized control hardware used to implement some of the illustrated embodiments do not limit the present disclosure. The instructions may be implemented, for example, using any suitable programing language, which may include high-level, low-level, object-oriented, visual, compiled or interpreted programming languages, such as, but not limited to, C, C++, C #, Java, BASIC, SQL, Perl, Matlab, Pascal, Visual BASIC, assembly language, machine code, and so forth. The examples are not limited in this context.

The methods, systems, devices (e.g., date device 14, requesting device 50), and components of the devices have been illustrated and described herein as comprising several separate functional elements, such as modules or units. Although certain of such modules or units may be described by way of example, it can be appreciated that a greater or lesser number of modules or units may be used and still fall within the scope of the examples. Further, although various examples may be described in terms of modules or units to facilitate description, such modules or units may be implemented by one or more hardware components (e.g., embedded systems/peripherals, processors, chips, FPGAs, DSPs, PLDs, ASICs, circuits, registers, servers, clients, network switches and routers), software components (e.g., programs, subroutines, logic) and/or combination thereof. It can be appreciated that, in certain aspects, a single component may be replaced by multiple components, and multiple components may be replaced by a single component, to provide an element or structure or to perform a given function or functions. Except where such substitution would not be operative to practice certain examples of the present disclosure, such substitution is considered within the scope of the present disclosure. In one example, the all or a portion of the system, its features or functional elements, modules, units, etc. or one or more steps of the method may be associated with, implemented by, executed on, or embedded in (e.g., as embedded software/firmware) one or more hardware components, (e.g., as described above). Further, such one or more components so configured may be installed or associated with one or more devices and therein configured to perform the herein described system functionalities or methods. The modules or units may comprise, or be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based IC processes such as complementary metal oxide semiconductor (CMOS), bipolar, and bipolar CMOS (BiCMOS) processes, for example. The examples are not limited in this context It may be appreciated that terms such as "processing", "generating", "determining", or the like, unless stated otherwise, refer to the action or processes of a computer or computing system, or similar electronic computing device, that manipulates or transforms data represented as physical quantities (e.g., electronic) within the computing system's registers or memories into other data similarly represented as physical quantities within the computing system's memories, registers or other such information storage, transmission or display devices. The examples are not limited in this context. An action such as "identifying" or "matching" when performed by a computer or computer system may include identification by determining, accessing system data, comparisons with system data, instructions, or the like. An action such as initiating may include causing an event or thing initiated either directly or indirectly. For example, initiating may include signaling, providing power or instructions, physical manipulation, transmission of data, calculation of conditions, or other step resulting in the event sought to be initiated. Furthermore, an action such as "storing", when used in reference to a computer or computer system, refers to any suitable type of storing operation including, for example, storing a value to memory, storing a value to cache memory, storing a value to a processor register, and/or storing a value to a non-volatile data storage device.

This specification has been written with reference to various non-limiting and non-exhaustive examples. However, it will be recognized by persons having ordinary skill in the art that various substitutions, modifications, or combinations of any of the disclosed examples (or portions thereof) may be made within the scope of this specification. Thus, it is contemplated and understood that this specification supports additional examples not expressly set forth in this specification. Such examples may be obtained, for example, by combining, modifying, or reorganizing any of the disclosed steps, components, elements, features, aspects, characteristics, limitations, and the like, of the various non-limiting and non-exhaustive examples described in this specification. In this manner, Applicant reserves the right to amend the claims during prosecution to add features as variously described in this specification.

What is claimed is:

1. A system, comprising:
   a first computing device comprising:
   one or more first memory units configured to store one or more first instructions; and
   one or more first processors coupled to the first memory units and configured, upon executing the one or more first instructions, to:
   generate a first set of tokens;
   receive a request, from a second computing device, for a portion of a streaming file;
   generate a first encryption key;
   encrypt the requested portion of the streaming file using the first encryption key;
   break the first encryption key into a plurality of key portions;
   determine, from the first set of tokens, a first token for each of the plurality of key portions;
   generate a packet comprising the encrypted requested portion of the streaming file, and further comprising the first tokens; and transmit the packet for receipt by the second computing device, wherein the first encryption key is not transmitted for receipt by the second computing device; and the second computing device comprising:
one or more second memory units configured to store one or more second instructions; and
one or more second processors coupled to the second memory units and configured, upon executing the one or more second instructions, to:
generate a second set of tokens that matches the first set of tokens;
receive the packet;
match each of the first tokens to a second token in the second set of tokens;
determine the plurality of key portions based on the second tokens;
re-assemble the plurality of key portions into the first encryption key;
de-crypt the encrypted requested portion of the streaming file using the first encryption key; and
transmit the requested portion of the streaming file to a user of the second computing device.

2. The system of claim 1, wherein:
the one or more first processors of the first computing device are further configured, upon executing the one or more first instructions, to:
following transmission of the packet, generate a third set of tokens;
receive a request, from the second computing device, for a second portion of the streaming file;
generate a second encryption key;
encrypt the requested second portion of the streaming file using the second encryption key;
break the second encryption key into a plurality of second key portions;
determine, from the third set of tokens, a third token for each of the plurality of second key portions;
generate a second packet comprising the encrypted requested second portion of the streaming file, and further comprising the third tokens; and
transmit the second packet for receipt by the second computing device; and
the one or more second processors of the second computing device are further configured, upon executing the one or more second instructions, to:
following receipt of the packet, generate a fourth set of tokens that matches the third set of tokens;
receive the second packet;
match each of the third tokens to a fourth token in the fourth set of tokens;
determine the plurality of second key portions based on the fourth tokens;
re-assemble the plurality of second key portions into the second encryption key;
de-crypt the encrypted requested second portion of the streaming file using the second encryption key; and
transmit the requested second portion of the streaming file to the user of the second computing device.

3. The system of claim 1, wherein the streaming file comprises a streaming audio file or a streaming video file.

4. A system, comprising:
a first computing device comprising:
one or more memory units configured to store one or more instructions;
one or more processors coupled to the memory units and configured, upon executing the one or more instructions, to:
determine a first set of tokens;
receive a request, from a second computing device, for data;
generate a first encryption key;
encrypt the requested data using the first encryption key;
determine, from the first set of tokens, a plurality of tokens for the first encryption key, wherein in order to determine the plurality of tokens for the first encryption key, the one or more processors are further configured, upon executing the one or more instructions, to:
break the first encryption key into a plurality of key portions; and
determine, from the first set of tokens, a first token for each of the plurality of key portions, wherein the plurality of tokens comprises the first tokens;
generate a packet comprising the encrypted requested data, and further comprising the plurality of tokens; and
transmit the packet for receipt by the second computing device, wherein the first encryption key is not transmitted for receipt by the second computing device;
wherein the second computing device is configured to:
determine a second set of tokens that matches the first set of tokens;
receive the packet;
determine the first encryption key using the plurality of tokens and the second set of tokens;
de-crypt the encrypted requested data using the first encryption key; and
transmit the requested data to a user of the second computing device.

5. The system of claim 4, wherein the one or more processors of the first computing device are further configured, upon executing the one or more instructions, to:
determine a second set of tokens;
receive a request, from the second computing device, for second data;
generate a second encryption key;
encrypt the requested second data using the second encryption key;
determine, from the second set of tokens, a plurality of second tokens for the second encryption key;
generate a second packet comprising the encrypted requested second data, and further comprising the plurality of second tokens; and
transmit the second packet for receipt by the second computing device.

6. The system of claim 4, wherein the data comprises a document, an audio file, a video file, a streaming audio file, or a streaming video file.

7. The system of claim 4, wherein each of the plurality of key portions comprises a byte of the first encryption key.

8. The system of claim 4, wherein each of the plurality of key portions comprises 4 bits of the first encryption key.

9. The system of claim 4, wherein the one or more processors of the first computing device are further configured, upon executing the one or more instructions, to generate the first set of tokens in real time.

10. The system of claim 4, wherein each of the first set of tokens is associated with an individual hexadecimal value.

11. The system of claim 4, wherein the first encryption key is not stored on disk.

12. The system of claim 4, wherein the packet further comprises one or more chaff tokens.

13. The system of claim 4, further comprising:
the second computing device, comprising:
one or more second memory units configured to store one or more second instructions; and
one or more second processors coupled to the second memory units and configured, upon executing the one or more second instructions, to:
determine the second set of tokens that matches the first set of tokens;
receive the packet;
determine the first encryption key using the plurality of tokens and the second set of tokens;
de-crypt the encrypted requested data using the first encryption key; and
transmit the requested data to the user of the second computing device.

14. A method, comprising:
determining, by one or more processors of a first computing device, a first set of tokens;
receiving, by the one or more processors and from a second computing device, a request for data;
generating, by the one or more processors, a first encryption key;
encrypting, by the one or more processors, the requested data using the first encryption key;
determining, from the first set of tokens by the one or more processors, a plurality of tokens for the first encryption key, wherein determining the plurality of tokens for the first encryption key comprises:
breaking the first encryption key into a plurality of key portions; and
determining, from the first set of tokens, a first token for each of the plurality of key portions, wherein the plurality of tokens comprises the first tokens;
generating, by the one or more processors, a packet comprising the encrypted requested data, and further comprising the plurality of tokens;
transmitting, by the one or more processors, the packet for receipt by the second computing device, wherein the first encryption key is not transmitted for receipt by the second computing device;
determining, by one or more processors of the second computing device, a second set of tokens that matches the first set of tokens;
receiving, by the one or more processors of the second computing device, the packet;
determining, by the one or more processors of the second computing device, the first encryption key using the plurality of tokens and the second set of tokens;
de-crypting, by the one or more processors of the second computing device, the encrypted requested data using the first encryption key; and
transmitting, by the one or more processors of the second computing device, the requested data to a user of the second computing device.

15. The method of claim 14, wherein the data comprises a document, an audio file, a video file, a streaming audio file, or a streaming video file.

16. The method of claim 14, wherein the first encryption key is not stored on disk.

17. A tangible non-transitory computer readable medium comprising logic configured, when executed by one or more processors, to:
determine a first set of tokens;
receive a request, from a second computing device, for data;
generate a first encryption key;
encrypt the requested data using the first encryption key;
determine, from the first set of tokens, a plurality of tokens for the first encryption key, wherein in order to determine the plurality of tokens for the first encryption key, the logic is further configured, when executed by the one or more processors, to:
break the first encryption key into a plurality of key portions; and
determine, from the first set of tokens, a first token for each of the plurality of key portions, wherein the plurality of tokens comprises the first tokens;
generate a packet comprising the encrypted requested data, and further comprising the plurality of tokens; and
transmit the packet for receipt by the second computing device, wherein the first encryption key is not transmitted for receipt by the second computing device;
wherein the second computing device is configured to:
determine a second set of tokens that matches the first set of tokens;
receive the packet;
determine the first encryption key using the plurality of tokens and the second set of tokens;
de-crypt the encrypted requested data using the first encryption key; and
transmit the requested data to a user of the second computing device.

* * * * *